United States Patent
Chang et al.

(10) Patent No.: US 10,286,567 B2
(45) Date of Patent: May 14, 2019

(54) NON-CONTACT GESTURE CONTROLLABLE ROBOT

(71) Applicant: HIWIN TECHNOLOGIES CORP., Taichung (TW)

(72) Inventors: Che-Hsuan Chang, Taichung (TW); Chih-Hsuan Chen, Taichung (TW); Po-Chiao Huang, Taichung (TW); Zong-Sian Jiang, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 248 days.

(21) Appl. No.: 15/585,554

(22) Filed: May 3, 2017

(65) Prior Publication Data

US 2018/0319024 A1    Nov. 8, 2018

(51) Int. Cl.
*G01C 21/00* (2006.01)
*B25J 19/02* (2006.01)
*G06K 9/00* (2006.01)
*H04N 5/33* (2006.01)

(52) U.S. Cl.
CPC ........ *B25J 19/021* (2013.01); *G06K 9/00355* (2013.01); *H04N 5/33* (2013.01); *G05B 2219/35444* (2013.01)

(58) Field of Classification Search
CPC ..... B25J 19/021; G06K 9/00355; H04N 5/33; G05B 2219/35444
See application file for complete search history.

(56) References Cited

U.S. PATENT DOCUMENTS

| | | | |
|---|---|---|---|
| 2011/0288964 A1* | 11/2011 | Linder | B25J 9/1689 705/27.1 |
| 2012/0038582 A1* | 2/2012 | Grant | G06F 3/016 345/174 |
| 2012/0294696 A1* | 11/2012 | Summer | B25J 9/1689 414/1 |

* cited by examiner

*Primary Examiner* — Ian Jen
(74) *Attorney, Agent, or Firm* — Michael Best & Friedrich LLP

(57) ABSTRACT

A robot includes a moving mechanism, a sensor device and a control device. The sensor device senses a gesture of a user hand in a sensing zone thereof. The control device causes the moving mechanism to perform an action instruction that corresponds to the gesture when the gesture matches a piece of gesture data in a gesture database thereof.

10 Claims, 9 Drawing Sheets

NON-CONTACT GESTURE CONTROLLABLE ROBOT

FIELD

The disclosure relates to a robot, and more particularly to a non-contact gesture controllable robot.

BACKGROUND

Conventionally, a robotic arm is required to be programmed with a machining process for performing desired treatments on an article.

However, when the machining process is under optimization for, as an example, determining a final appearance of the article, the continuous updates of the machining process may be time consuming. Accordingly, techniques that may enable instant adjustments of the robotic arm's actions according to the user's demand is required.

Chinese Patent No. CN103921265A discloses a conventional robot operable to move by user operation of a handheld remote controller.

SUMMARY

Therefore, an object of the disclosure is to provide a robot that can alleviate at least one of the drawbacks of the prior art.

According to the disclosure, the robot includes a base, a moving mechanism, a sensor device and a control device. The moving mechanism includes a driver module mounted to the base, and a driven member that is configured to be driven by the driver module to move in one of a first direction, a second direction and a third direction. The first, second and third directions are perpendicular to each other. The sensor device is mounted to the driven member, and faces toward a sensing zone thereof for sensing, in a non-contact manner, a gesture performed by a user hand in the sensing zone. The sensing zone is separate from the sensor device by a minimum sensing distance in the third direction. The control device is electrically coupled to the driver module and the sensor device, has a gesture database, and an action instruction database corresponding to the gesture database, and is configured to, when the gesture that is performed by the user hand in the sensing zone and that is sensed by the sensor device matches a piece of gesture data included in the gesture database, cause the driver module to execute an action instruction that is included in the action instruction database and that corresponds to the piece of gesture data.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
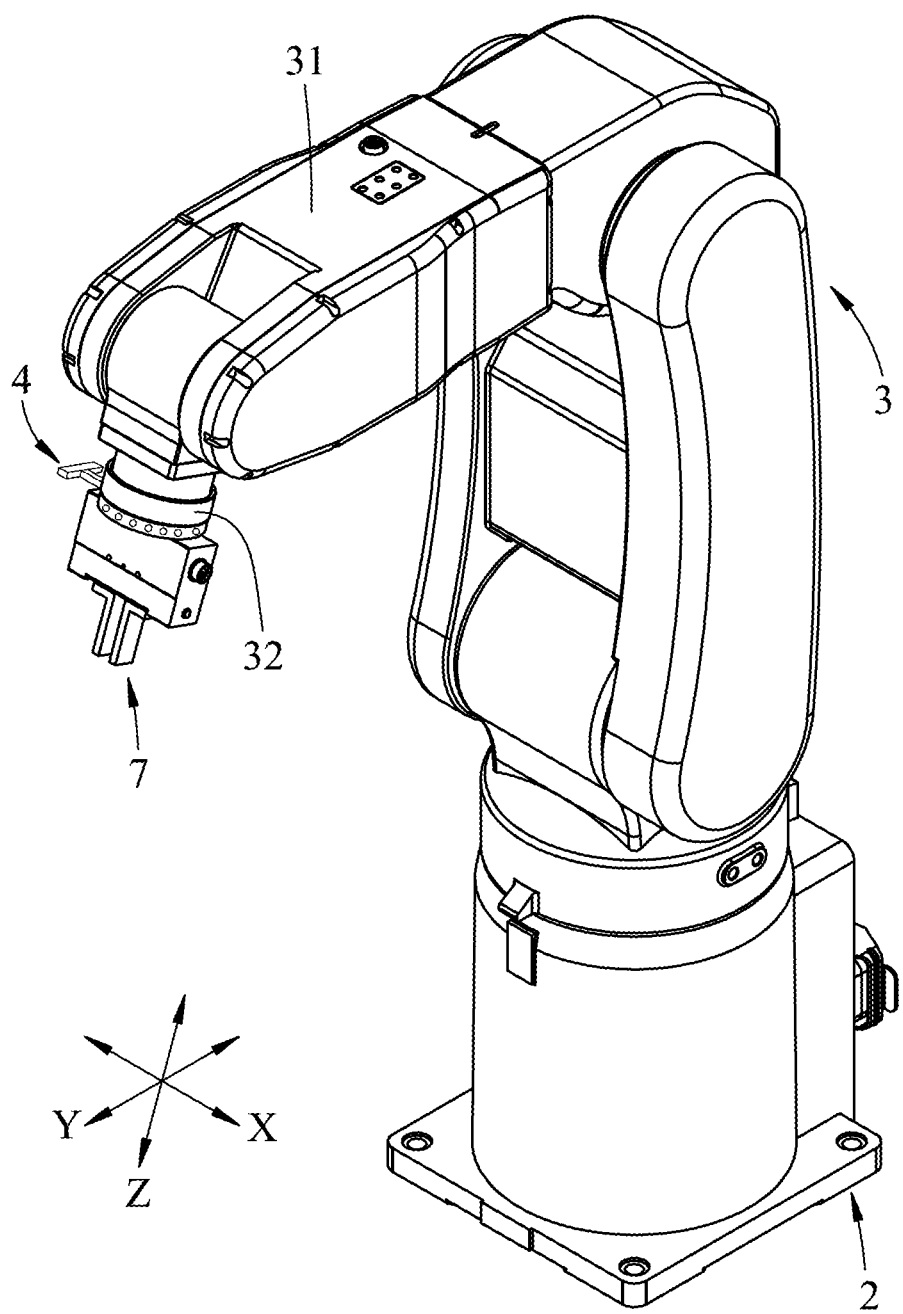
FIG. 1 is a perspective view illustrating an embodiment of the robot according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
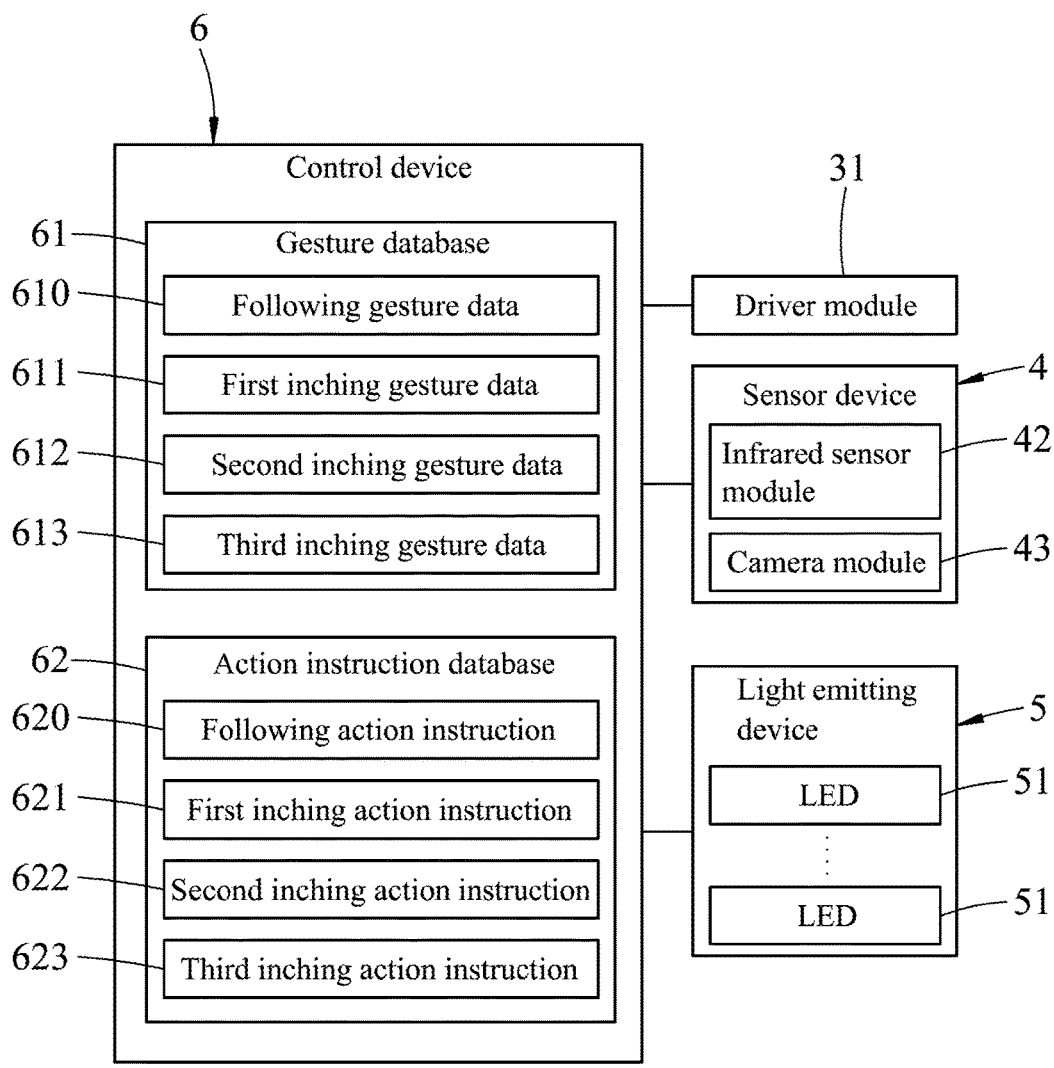
FIG. 2 is a block diagram illustrating the embodiment.
Figure 3:
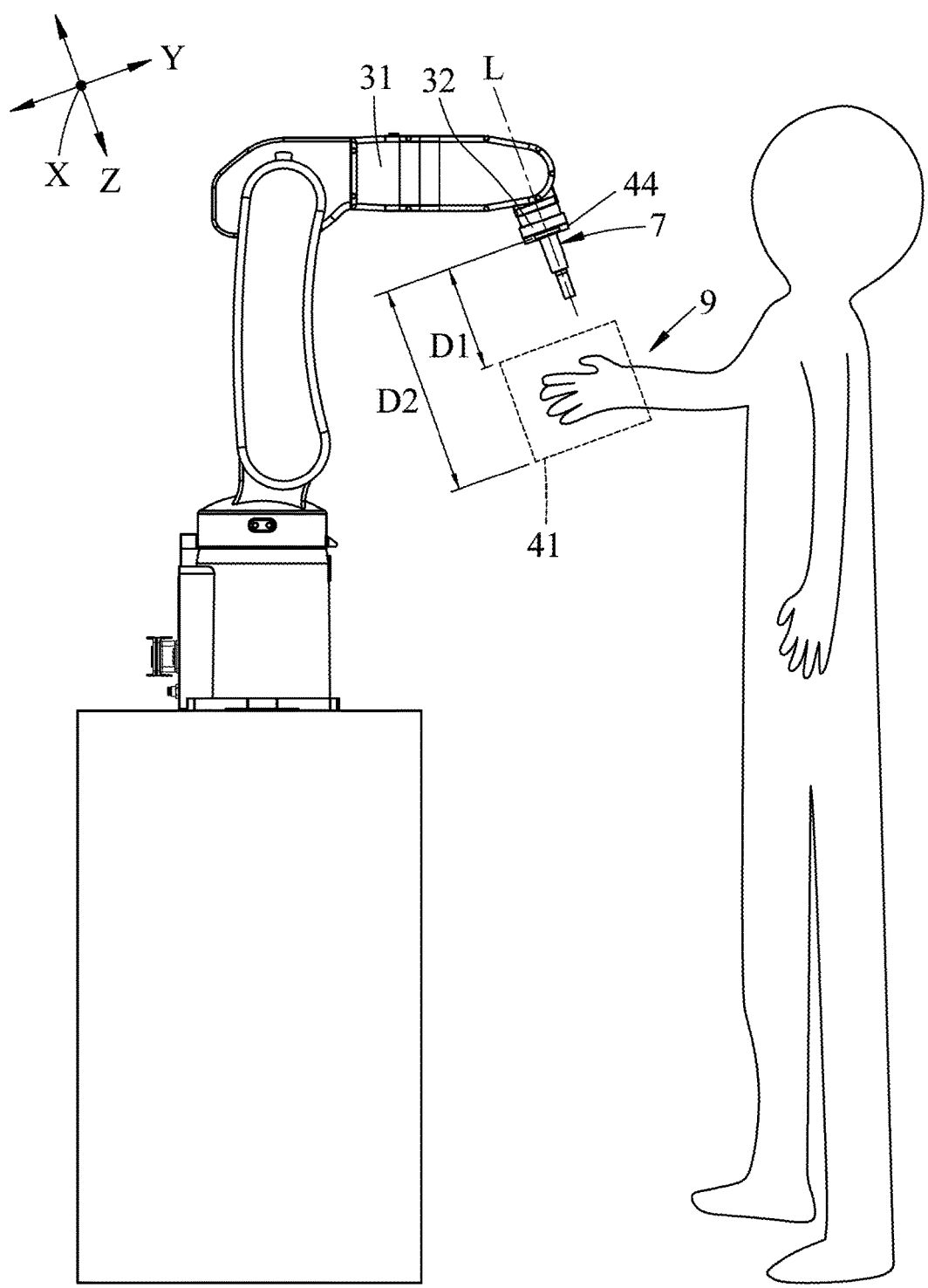
FIG. 3 is a schematic diagram illustrating use of the embodiment.

Referring to FIGS. 1 to 3, the embodiment of the non-contact gesture controllable robot includes a base 2, a moving mechanism 3, a sensor device 4, a light emitting device 5, a control device 6 and an end effector 7.

The moving mechanism 3 includes a driver module 31 mounted to the base 2, and a driven member that is configured to be driven by the driver module 31 to move in one of a first direction (X), a second direction (Y) and a third direction (Z). In this embodiment, the driven member is a flange 32, but this disclosure is not limited thereto. The first, second and third directions (X, Y, Z) are perpendicular to each other. In this embodiment, the moving mechanism 3 is a six-axis robotic arm, and the driver module 31 includes a plurality of motors operable to drive joints of the moving mechanism 3. However, the moving mechanism 3 may be other types of robotic arm, such as a parallel robotic arm, etc., and this disclosure is not limited thereto.

Figure 4:
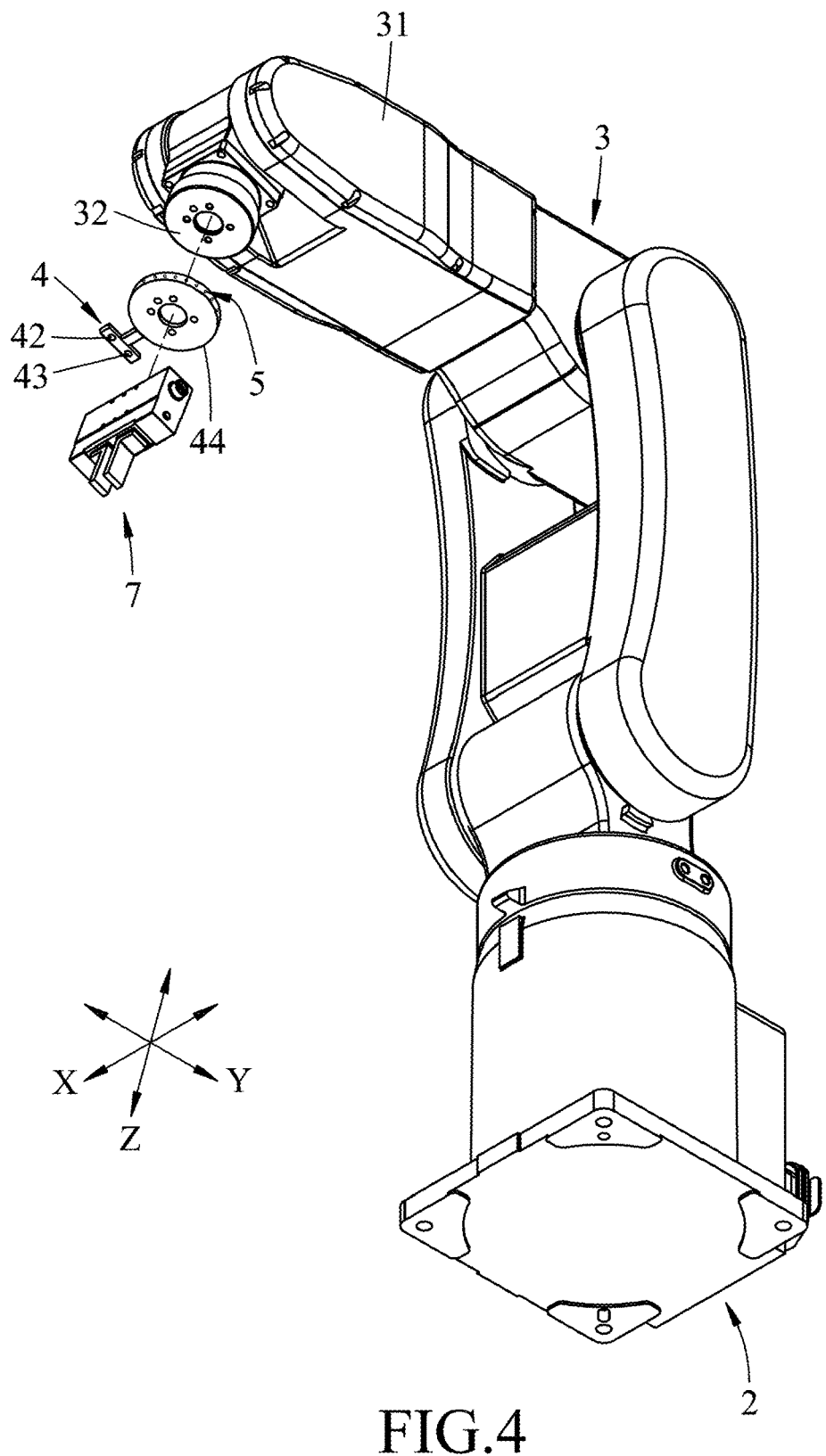
FIG. 4 is a partially exploded perspective view illustrating the embodiment.
Figure 5:
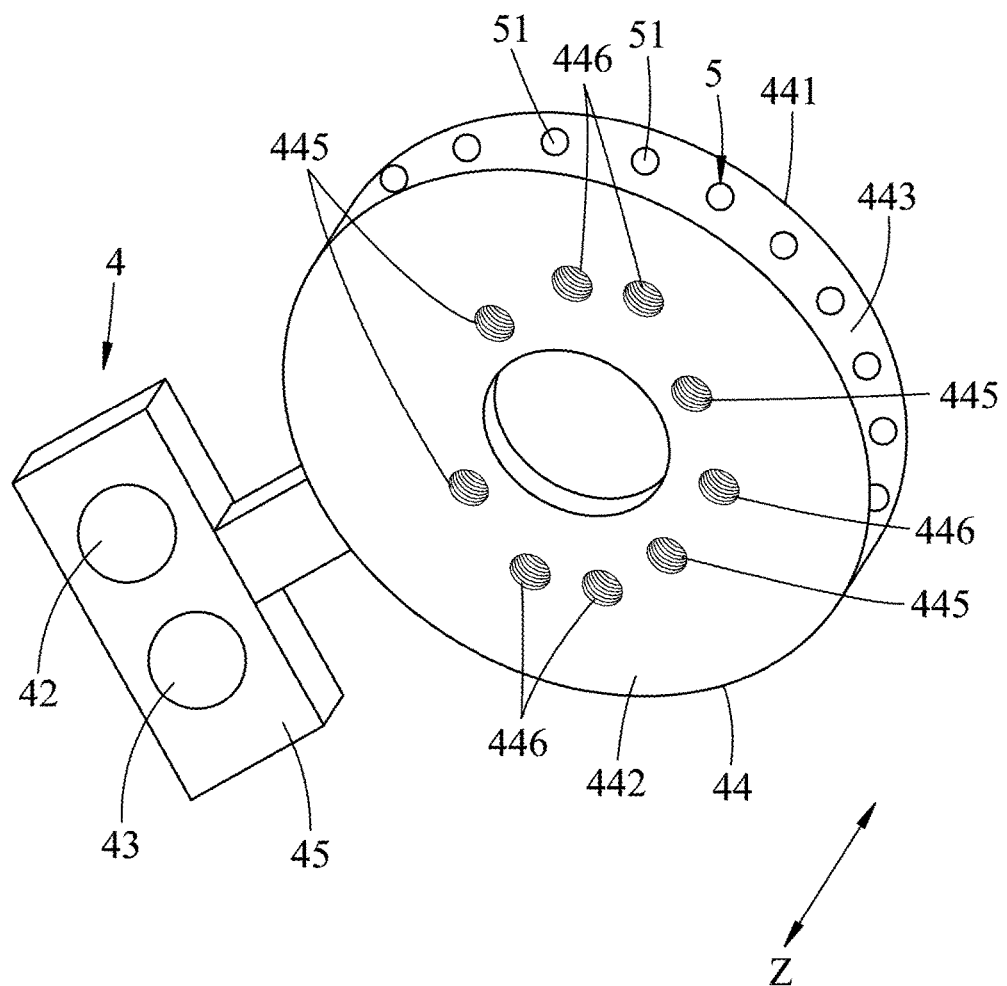
FIG. 5 is a perspective view illustrating a sensor device and a light emitting device of the embodiment.

Referring to FIGS. 3 to 5, the sensor device 4 is mounted to the flange 32, and faces a sensing zone 41 thereof (defined by a range of the sensor device 4) for sensing, in a non-contact manner, a gesture performed by a user hand 9 in the sensing zone 41. The sensor device 4 includes an infrared sensor module 42 that is configured to sense whether or not the user hand 9 is in the sensing zone 41, a camera module 43 that is configured to capture images in a direction toward the sensing zone 41, an adaption board 44 on which the light emitting device 5 and the end effector 7 are mounted, and a bracket 45 to which the infrared sensor module 42 and the camera module 43 are mounted. In this embodiment, the camera module 43 uses one set of lenses to capture images, but may use multiple sets of lenses to capture three-dimensional images in other embodiments.

Figure 6:
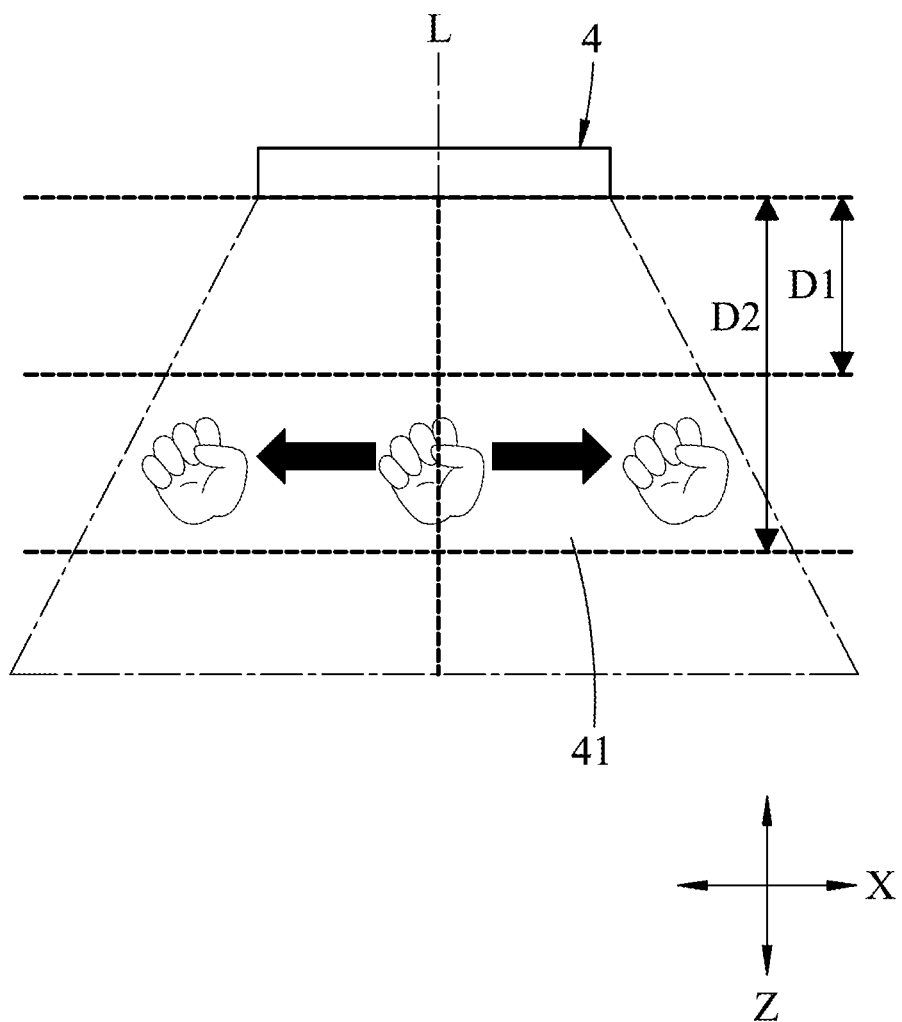
FIG. 6 is another schematic diagram illustrating use of the embodiment.
Figure 7:
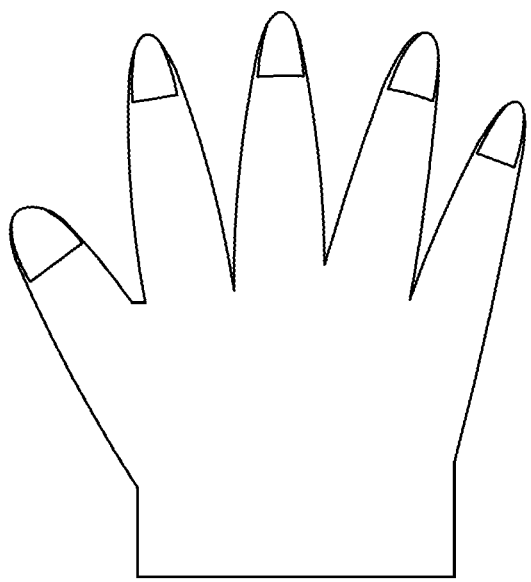
FIGS. 7-11 are schematic diagrams illustrating image data stored in a gesture database of the embodiment.
Figure 8:
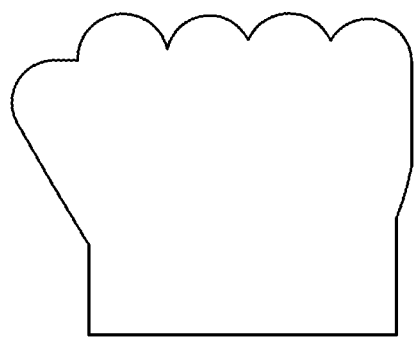
Figure 9:
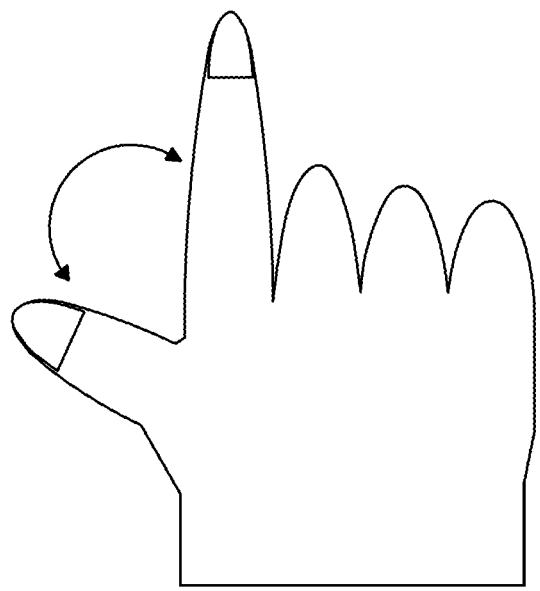
Figure 10:
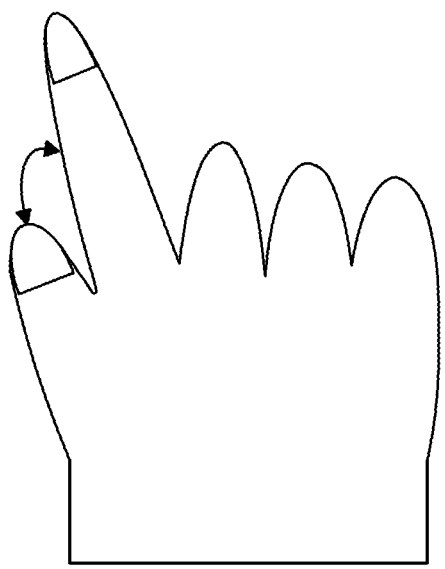
Figure 11:
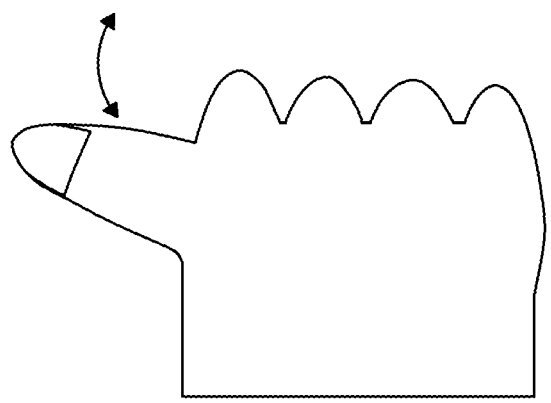

Referring to FIGS. 3, 4 and 6, the sensing zone 41 is separate from the sensor device 4 by a minimum sensing distance (D1) along an axis (L) parallel to the third direction (Z), and ranges between the minimum sensing distance (D1) and a maximum sensing distance (D2) from the sensor device 4 in the third direction (Z). In this embodiment, the minimum sensing distance (D1) is ten centimeters, and the maximum sensing distance (D2) is twenty centimeters.

Referring to FIGS. 3 to 5, the adaption board 44 has an installation surface 441 to which the flange 32 is mounted, a working surface 442 which is opposite to the installation surface 441 and to which the end effector 7 is mounted, and a surrounding surface 443 which interconnects the installation surface 441 and the working surface 442 and to which the bracket 45 is mounted. The adaption board 44 has screw holes 445 for threadedly engaged with the flange 32, and screwholes 446 for threadedly engaged with the end effector 7. In this embodiment, the installation surface 441 and the working surface 442 are parallel to each other, and are perpendicular to the third direction (Z).

The light emitting device 5 is mounted to the adaption board 44, is electrically coupled to the control device 6, and includes a plurality of light emitting diodes 51 mounted to the surrounding surface 443. The light emitting device 5 is configured to emit light in different manners (e.g., having different colors) corresponding to different states in which the robot operates.

Referring to FIGS. 2, 3 and 5, the control device 6 is electrically coupled to the driver module 31, the sensor device 4 and the light emitting device 5, and has a gesture database 61, and an action instruction database 62 corresponding to the gesture database 61. When the gesture that is performed by the user hand 9 in the sensing zone 41 and that is sensed by the sensor device 4 matches a gesture included in the gesture database 61, which may for example be determined according to comparison by the control device 6, the control device 6 causes the driver module 31 to execute an action instruction that is included in the action instruction database 62 and that corresponds to the matched gesture included in the gesture database 61.

The gesture database 61 includes following gesture data 610, a first inching gesture data 611, a second inching gesture data 612 and a third inching gesture data 613. In this embodiment, the gesture data 610-613 are image data of hand actions.

The action instruction database 62 includes a following action instruction 620, a first inching action instruction 621, a second inching action instruction 622 and a third inching action instruction 623 that respectively correspond to the following gesture data 610, the first inching gesture data 611, the second inching gesture data 612 and the third inching gesture data 613. The following action instruction 620 is configured to cause the driver module 31 to drive the flange 32 to follow movement of the user hand 9; the first inching action instruction 621 is configured to cause the driver module 31 to drive inching of the flange 32 in the first direction (X); the second inching action instruction 622 is configured to cause the driver module 31 to drive inching of the flange 32 in the second direction (Y); and the third inching action instruction 623 is configured to cause the driver module 31 to drive inching of the flange 32 in the third direction (Z).

The end effector 7 is mounted to the working surface 442 of the adaption board 44, and is controllable by the control device 6 to act. In this embodiment, the end effector 7 is a clamp claw that is operable to open or close, that is threaded to the adaption board 44, and that may be used to clamp a to-be-processed article (not shown), a processing tool (not shown), etc. In the same or other embodiments, the end effector 7 may be a sucker or an ejection mechanism. It should be noted that the directions (X, Y, Z) may be a user-defined coordinate system that is suitable for the end effector 7.

Referring to FIGS. 2, 3 and 6, in use, the sensor device 4 continuously performs detection within the sensing zone 41. When a gesture that is performed by the user hand 9 in the sensing zone 41 and that is sensed by the sensor device 4 matches the following gesture data 610, the control device 6 executes the following action instruction 620 to cause the driver module 31 to drive the flange 32 to follow movement of the user hand 9; when the gesture that is performed by the user hand 9 in the sensing zone 41 and that is sensed by the sensor device 4 matches the first inching gesture data 611, the control device 6 executes the first inching action instruction 621 to cause the driver module 31 to drive movement of the flange 32 by a first inching distance in the first direction (X); when the gesture that is performed by the user hand 9 in the sensing zone 41 and that is sensed by the sensor device 4 matches the second inching gesture data 612, the control device 6 executes the second inching action instruction 622 to cause the driver module 31 to drive movement of the flange 32 by a second inching distance in the second direction (Y); and when the gesture that is performed by the user hand 9 in the sensing zone 41 and that is sensed by the sensor device 4 matches the third inching gesture data 613, the control device 6 executes the third inching action instruction 623 to cause the driver module 31 to drive movement of the flange 32 by a third inching distance in the third direction (Z). In this embodiment, each of the first, second, and third inching distances is adjustable between one millimeter and ten millimeters.

For example, the following gesture data 610 and the first to third inching gesture data 611-613 may correspond to image data as shown in FIGS. 7 to 11. When the infrared sensor module 42 senses that the user hand 9 is in the sensing zone 41, the camera module 43 captures images of the user hand 9 that is in the sensing zone 41. Upon the control module 6 determining that the images of the user hand 9 match a piece of the gesture data, the control module 6 causes the driver module 31 to execute the corresponding action instruction.

When the following action instruction 620 is executed, the control device 6 causes the driver module 31 to, according to the direction and the distance that the user hand 9 subsequently moves in the sensing zone 41, bring the flange 32, along with the adaption board 44 and the end effector 7, into movement in the same direction and by the same distance. Since a remote controller is not required to control operation of the robot, the adverse effects caused by static electricity resulting from contact between the human body and the remote controller may be prevented. In this embodiment, the control device 6 is configured to cause the driver module 31 to initiate operation only after the user hand 9 moves by a distance greater than a predetermined distance (e.g., 5 centimeters) and maintains at a last position for a predetermined time interval (e.g., one second), so as to prevent a wrong move resulting from unintentional swaying of the user hand 9.

When one of the first, second and third inching action instructions 621-623 is executed, the control device 6 causes the driver module 31 to, according to different subsequent actions of the user hand 9 in the sensing zone 41, drive the flange 32, along with the adaption board 44 and the end effector 7, to inch in a corresponding manner. For instance, two fingers that open (e.g., FIG. 9) or two fingers that are put together (e.g., FIG. 10) may be an inching action instruction, that together with one of the first, second and third inching action instructions 621-623, causes the flange 32, along with the adaption board 44 and the end effector 7, to move forward or backward in the corresponding direction. Since using of the fingers is more expedient than using a remote controller, processing efficiency may thus be promoted.

Referring to FIGS. 2, 3 and 5, in this embodiment, the light emitting diodes 51 are controlled by the control device 6 to emit light in different manners corresponding to different states in which the robot operates. For example, when the robot is in a state of normally stopping, the control device 6 controls the light emitting diodes 51 to emit steady green light; when the robot is in a state of normally moving, the control device 6 controls the light emitting diodes 51 to emit flashing green light; when the robot is in a state of error, the control device 6 controls the light emitting diodes 51 to emit flashing red light and causes the driver module 31 to stop operation; when the robot is in a state of executing the following action instruction 621 and recording the subsequent movement of the user hand 9 (i.e., the direction and distance that the user hand 9 moves) in the sensing zone 41, the control device 6 controls the light emitting diodes 51 to emit flashing blue light; and when the robot is in a state of executing the following action instruction 621 and moving according to the recorded movement, the control device 6 controls the light emitting diodes 51 to emit steady blue light. Thus, the user may easily be made aware of the operation state of the robot according to the light emission style and color of the light emitting diodes 51.

It should be noted that, in addition to using a fixed hand gesture to control the movement of the robot as described in the embodiment, a transition from a specific hand gesture to another specific hand gesture may also be used for controlling the movement of the robot.

In the embodiment, the robot is allowed to move only when the user hand 9 is in the sensing zone 41, thereby ensuring safety of use. By virtue of non-contact control of the robot to cause the end effector 7 to move or open/close through use of the sensor device 4, electrostatic interference from a handheld remote controller may be prevented, so this disclosure may be applicable in environments where dusts and static electricity are strictly controlled. In addition, since the working surface 442 of the adaption board 44 is perpendicular to the third direction (Z), movement of the end effector 7 is in the same direction in which the user hand 9 moves, enabling straightforward control by the user and resulting in convenience in use.

To conclude, via the configuration of the driver module 31, the sensor device 4 and the control device 6, the driver module 31 may execute the instructions corresponding to the gestures of the user hand 9, thereby achieving non-contact control of the robot.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A robot comprising:
   a base;
   a moving mechanism that includes a driver module mounted to said base, and a driven member that is configured to be driven by said driver module to move in one of a first direction, a second direction and a third direction, the first, second and third directions being perpendicular to each other;
   a sensor device mounted to said driven member, and facing a sensing zone thereof for sensing, in a non-contact manner, a gesture performed by a user hand in the sensing zone, the sensing zone being separate from said sensor device by a minimum sensing distance in the third direction; and
   a control device electrically coupled to said driver module and said sensor device, having a gesture database and an action instruction database corresponding to said gesture database, and configured to, when the gesture that is performed by the user hand in the sensing zone and that is sensed by said sensor device matches a piece of gesture data included in said gesture database, cause said driver module to execute an action instruction that is included in said action instruction database and that corresponds to the piece of gesture data.

2. The robot of claim 1, wherein said gesture database includes following gesture data, and said action instruction database includes a following action instruction that corresponds to said following gesture data and that causes said driver module to drive said driven member to follow movement of the user hand; and
   wherein said control device is further configured to, when the gesture that is performed by the user hand in the sensing zone and that is sensed by said sensor device matches said following gesture data, execute said following action instruction to cause said driver module to drive said driven member to follow movement of the user hand.

3. The robot of claim 1, wherein said gesture database includes first inching gesture data, second inching gesture data and third inching gesture data, and said action instruction database includes:
   a first inching action instruction that corresponds to said first inching gesture data and that causes said driver module to drive inching of said driven member in the first direction;
   a second inching action instruction that corresponds to said second inching gesture data and that causes said driver module to drive inching of said driven member in the second direction; and
   a third inching action instruction that corresponds to said third inching gesture data and that causes said driver module to drive inching of said driven member in the third direction;
   wherein said control device is further configured to, when the gesture that is performed by the user hand in the sensing zone and that is sensed by said sensor device matches said first inching gesture data, execute said first inching action instruction to cause said driver module to drive movement of said driven member by a first inching distance in the first direction;
   wherein said control device is further configured to, when the gesture that is performed by the user hand in the sensing zone and that is sensed by said sensor device matches said second inching gesture data, execute said second inching action instruction to cause said driver module to drive movement of said driven member by a second inching distance in the second direction; and
   wherein said control device is further configured to, when the gesture that is performed by the user hand in the sensing zone and that is sensed by said sensor device matches said third inching gesture data, execute said third inching action instruction to cause said driver module to drive movement of said driven member by a third inching distance in the third direction.

4. The robot of claim 3, wherein each of the first, second, and third inching distances is adjustable between one millimeter and ten millimeters.

5. The robot of claim 1, wherein the sensing zone ranges between the minimum sensing distance and a maximum sensing distance from said sensor device in the third direction, the minimum sensing distance is ten centimeters, and the maximum sensing distance is twenty centimeters.

6. The robot of claim 1, wherein said sensor device includes an infrared sensor module that is configured to sense whether or not the user hand is in the sensing zone, and a camera module that is configured to capture images in a direction toward the sensing zone.

7. The robot of claim 6, further comprising:
a light emitting device that is electrically coupled to said control device, and that is configured to emit light in different manners corresponding to different states in which said robot operates; and
an end effector controllable by said control device to act;
wherein said sensor device further includes an adaption board on which said light emitting device and said end effector are disposed, and a bracket connected to said adaption board for mounting said infrared sensor module and said camera module thereto; and
wherein said adaption board has an installation surface to which said driven member is mounted, and a working surface which is opposite to said installation surface and to which said end effector is mounted.

8. The robot of claim 7, wherein the third direction is perpendicular to said working surface.

9. The robot of claim 7, wherein said adaption board further includes a surrounding surface which interconnects said installation surface and said working surface, and said light emitting device includes a plurality of light emitting diodes mounted to said surrounding surface.

10. The robot of claim 7, wherein the different manners in which said light emitting device is configured to emit light differ from each other in terms of at least one of color of light or emission style.

* * * * *